(12) United States Patent
Tanneberger et al.

(10) Patent No.: US 8,388,748 B2
(45) Date of Patent: Mar. 5, 2013

(54) PROCESS FOR THE PREPARATION OF NITROCELLULOSE SOLUTIONS HAVING A LOW WATER CONTENT

(75) Inventors: Holger Tanneberger, Bad Fallingbostel (DE); Lutz Driesen, Walsrode (DE); Juergen Engelstardt, Bad Fallingbostel (DE); Werner Lange, Visselhoevede (DE); Hans-Guenter Poersch-Panke, Bomlitz (DE)

(73) Assignee: Dow Global Technologies LLC, Midland, MI (US)

( * ) Notice: Subject to any disclaimer, the term of this patent is extended or adjusted under 35 U.S.C. 154(b) by 585 days.

(21) Appl. No.: 12/594,996

(22) PCT Filed: Mar. 31, 2008

(86) PCT No.: PCT/EP2008/002532
§ 371 (c)(1),
(2), (4) Date: Feb. 4, 2010

(87) PCT Pub. No.: WO2008/122379
PCT Pub. Date: Oct. 16, 2008

(65) Prior Publication Data
US 2010/0126382 A1    May 27, 2010

(30) Foreign Application Priority Data

Apr. 17, 2007 (DE) .......................... 10 2007 017 014

(51) Int. Cl.
*C08L 1/18* (2006.01)
*C09D 101/18* (2006.01)
(52) U.S. Cl. ................. 106/169.1; 106/169.34
(58) Field of Classification Search ............... 106/169.1, 106/169.34
See application file for complete search history.

(56) References Cited

U.S. PATENT DOCUMENTS 4,483,714 A    11/1984    Yamaue et al.
4,981,555 A    1/1991    Hohmann et al.

*Primary Examiner* — David M Brunsman

(57) ABSTRACT

The present invention relates to the continuous preparation of alcohol- and plasticizer-free finished nitrocellulose solutions having a particularly low water content by partial distillative falling-film evaporation of comparatively water-rich, optionally emulsion-like crude nitrocellulose solutions which are preferably provided by dissolving nitrocelluloses of the customary solid forms offered, which are known to be initially water-moist as a result of the preparation, in preferably ethyl acetate.

6 Claims, 1 Drawing Sheet

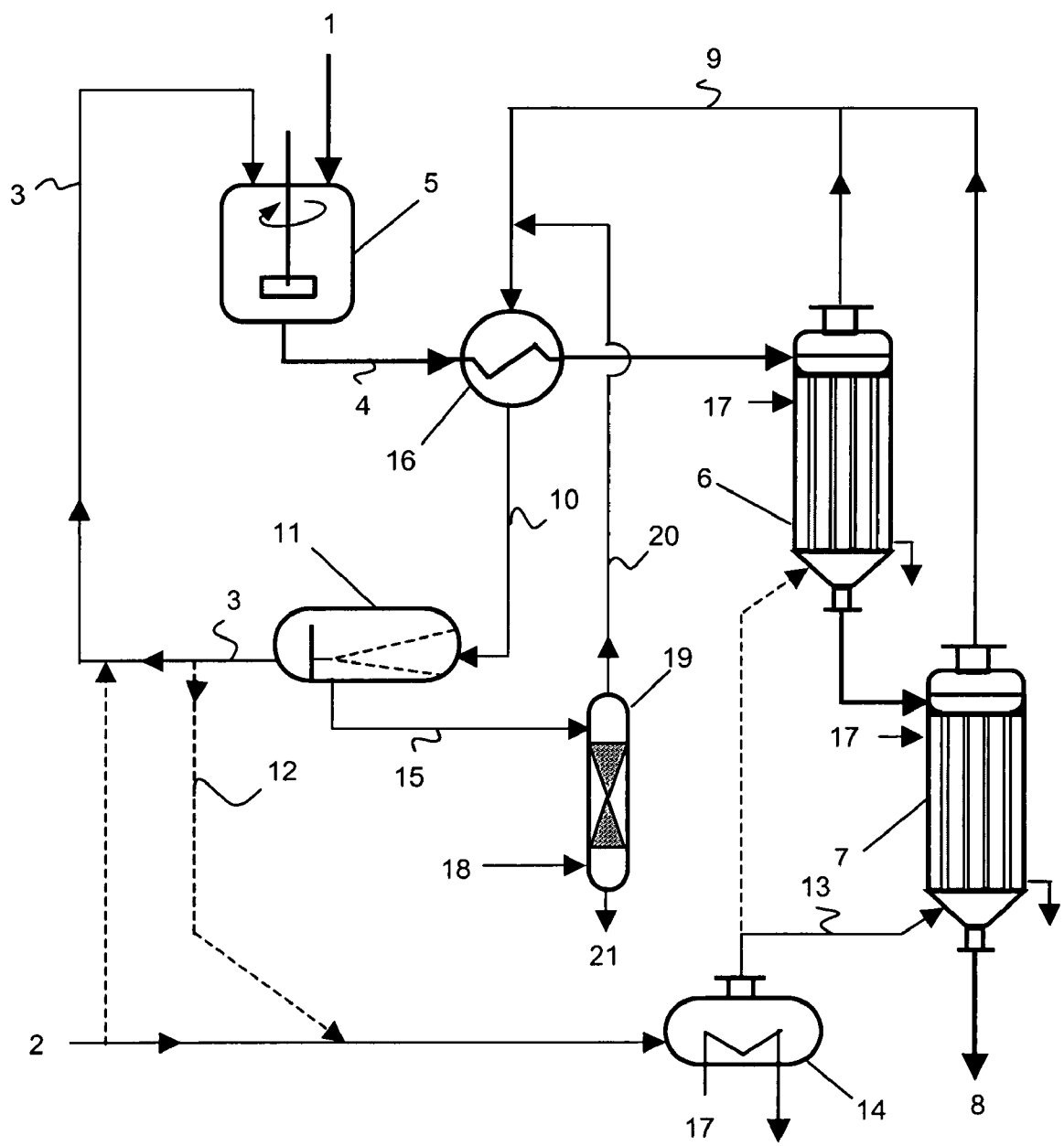

PROCESS FOR THE PREPARATION OF NITROCELLULOSE SOLUTIONS HAVING A LOW WATER CONTENT

CROSS REFERENCE TO RELATED APPLICATIONS

This application is a 35 USC §371 national phase filing of PCT/EP2008/002532 filed Mar. 31, 2008, which claims the benefit of German Application No. 10 2007 017 014.0, filed Apr. 7, 2007.

The present invention relates to the preparation of nitrocellulose solutions which are free of alcohol or plasticizer proportions and are distinguished by a particularly low water content.

Nitrocelluloses (also referred to below as "NC") which have a low degree of esterification and a nitrogen content of up to 12.6% by mass and are predominantly used in the coating and printing ink industry are introduced onto the market as moist solids having proportions of liquid densensitizers (ethanol, isopropanol, more rarely butanol or water are preferred) of 30 or 35% by mass (including the residual water in the case of alcohols). If the liquid content of the moist product falls below 25% by mass, these so-called industrial nitrocelluloses are then classified as "explosive substances" owing to the increased potential danger (Recommendations on the Transport of Dangerous Goods, 10th edition, of the United Nations, 1997). The residual water content in the product which is alcohol-moist in view of the intended use is from 2 to not more than 8% by mass, based on the moist product. Water-moist NC to which selected plasticizers have been added as desensitizers is plasticized thereby with elimination of water (virtually no longer any fiber structure) and, after thermal treatment, still contains from 1.5 to not more than 3% by mass of residual water in addition to the proportion of from 18 to 20% by mass of plasticizer. In the coating and printing ink industry, the moist NC types obtained as stated in desensitized form are introduced as solids into the formulation batches and dissolved therein. In special formulations, in particular for printing ink production, apart from the residual water said alcohols or plasticizers, as inevitably introduced with a solid NC correspondingly desensitized in each case, are disadvantageous.

However, in order to avoid such impurities, neither the manufacturer of industrial NC nor the coating and printing ink producer can deliver or use anhydrous and non-desensitized (i.e. dry and pure) NC in solid form for safety and legal reasons (for example, considerable effort with respect to safety according to explosives law) and to process it economically to give, for example, alcohol- and plasticizer-free NC solutions (referred to below as finished NC solution) having a low water content. A method conceivable for this purpose would be to convert preferably water-moist solid NC by means of suitable organic solvents into comparatively dilute water-rich and optionally also emulsion-like solutions (referred to below as "crude NC solution") in order, after addition of a preferably solid water binder (for example a molecular sieve), subsequently to remove the water in an appropriate manner from said crude solution. Even if the NC solution thus treated reaches the desired residual water content, a further considerably complicated procedure for purification and regeneration of the molecular sieve and of concentrating the NC solution having a low water content to give the desired finished NC solution follows for economic reasons. A considerable effort comparable with this procedure must be expected if, for example by combined introduction of designated organic NC solvents and organic NC nonsolvents into said crude NC solution, preferably two liquid phases which can be appropriately easily separated are produced, one of which, as low-NC as possible but correspondingly water-enriched, produces the desired dewatering. From economic necessity, the NC-rich phase is then to be concentrated to said finished solution and the solvent is to be substantially recovered from the aqueous phase.

DE 3041085 proposed special NC mixtures with NC solvents and NC nonsolvents, a process for their preparation and the use thereof as additives in polyurethane finishes. According to the invention, water-moist (25% by mass or more water in the solid moist material) nitrocelluloses are preferably used as starting material and are dissolved or at least gelled to a tacky pasty form (elimination of the fiber structure) in batchwise manner in a number of nominated typical organic NC solvents, but preferably in a multiplicity of individual mixtures each consisting of an NC solvent and an organic NC nonsolvent nominated from a number. The resulting (highly) viscous fluid or gel-like pasty products or products rendered solid again by addition of nonsolvent and optionally already shaped are thermally treated (with further addition of NC solvents and/or NC nonsolvents chiefly as entraining agents) for stripping off water. Depending on the chosen starting conditions and objectives, NC solutions having a low water content (about 1% by mass of water), tacky gel-like NC pastes or, particularly preferably, solid moist nitrocellulose moldings (e.g. pellets) can be produced, the residual fluid content of which in each case (at a level of at least 25% by mass for said required desensitization) consists of mixtures, according to the invention, of NC nonsolvents and NC solvents, which mixtures are compatible with PU finishes, and residual water (about 1% by mass). Dryers in combination with rotary evaporators, wherein the procedures for distillation or evaporation of NC batches introduced batchwise which are water-containing but according to the invention have already been pretreated with organic solvents and organic nonsolvents are carried with a mechanical support by rotating apparatus elements in vacuo, are mentioned as a key requirement for the design of the apparatus, in particular for the thermal process steps according to DE 3041085. For the preparation of NC solutions having a low water content according to DE 3041085, the distillation apparatuses used are expressly those evaporators which are equipped with appropriate scraping or scratching tools and should therefore constantly ensure a desired freeing of the heating surface in the evaporator from the adhering product layer. Although the term "thin-film evaporator" is not used for this in the patent, DE 3041085 imparts the technical teaching that rotary thin-film evaporators of known vertical or horizontal design having wiper elements (=scrapers/scratchers) acting on the heating surface, which in turn are mounted on a central shaft in the apparatus and are moved therewith, are the suitable apparatuses. Gravity-driven trickle or falling-film evaporators and also plate-type evaporators which are customary from the group consisting of the plate-type heat exchangers, all of which also operate with thin product layers but without any mechanical internals, are likewise not included. However, during the operation thereof, which of course is decisively determined by the existing viscosities of the fluids to be evaporated down, the heating surfaces wetted by the product in a comparatively thin layer must on no account be exposed (dewetted) (cf. also VDI-Wärmeatlas [VDI Heat Atlas], 7th edition 1994, sheet Md6, point 4 or E. G. WORONZOW, "Die minimale Reynoldszahl bei Rieselfilmen [The minimum Reynolds number in trickle films]", BWK 44 (1994) 5, pages 201-205).

Particularly obvious disadvantages of the invention which have become known with DE 3041085 are, inter alia, the expensive and complex mechanical complexity of the process in terms of apparatus and the energy consumption of the process in batchwise (discontinuous) dissolution, dilution and evaporation procedures of nitrocellulose in conjunction with organic solvents. In addition to this there are considerably complicated safety requirements in technical dimensions in the case of the thermal-mechanical treatment of nitrocellulose and predominantly flammable solvent (mixtures) and in particular the explosive vapors thereof, in order to prevent the admission of atmospheric oxygen, for example in vacuum operation which is preferred according to the invention but complicated.

It was therefore an object of the present invention to provide an alternative process for the preparation of alcohol- and plasticizer-free NC solutions having a low water content, according to which a range of NC types desired on the market can be reliably processed to give said finished NC solutions and these can be produced and offered in technically feasible (e.g. handleable viscosities) and economically advantageous concentrations and required qualities.

It was surprisingly found that the concentration methods known per se, as used in plate-type or falling-film evaporators of known designs, are also advantageously suitable for the thermal evaporation and concentration in particular of dilute and comparatively water-rich and consequently optionally also emulsion-like crude NC solutions to the desired clear but thermally sensitive and viscous finished NC solutions. However, it is particularly preferable to operate the entire evaporation process continuously by distillation as a gravity-driven falling-film evaporation with the solution flowing countercurrent to the expelled vapor and without external forced circulation (single pass, no proportionate recirculation) of the solution, a defined part of the solvent used for producing a dilute crude NC solution from preferably water-moist NC performing the function of an entraining agent for the water to be removed in view of the intended use.

The present invention therefore relates in the preferred embodiments to the one- to three-stage, but preferably two-stage, use of gravity-driven falling-film evaporators of customary design with vertical tube bundle in the jacket space, in order thereby to be able to produce a finished nitrocellulose solution of a quality which meets requirements in a distillative evaporation process gradated according to the invention from a preheated crude nitrocellulose solution provided, by a technically reliable, particularly economical method using simple apparatus. However, in a more general aspect of the present invention also other evaporators than gravity-driven falling-film evaporators may be used for producing the finished nitrocellulose solution. Alternative evaporators are, for example, rotary thin-film evaporators having oscillating wipers; helical-tube evaporators; plate-type evaporators; and a climbing-film evaporators.

In general, the subject matter of the invention is a process for the preparation of nitrocellulose solutions having a low water content by a thermal method, comprising the steps of
a) processing or treating a water-moist nitrocellulose having a proportion of water of 25 to 45% by mass, but preferably from 25 to 35% by mass, in or with a solvent, preferably in a stirring container, to give a crude nitrocellulose solution having a proportion of nitrocellulose of 3.5 to 12.5% by mass, but preferably from 4.5 to 9% by mass, and then
b) subjecting, preferably continuously, the crude nitrocellulose solution to an at least partial distillative evaporation process, and
c) taking off, preferably continuously, a finished nitrocellulose solution formed with a proportion of nitrocellulose of from 20 to 35% by mass, but preferably from 25 to 30% by mass, and a residual proportion of water of up to 1% by mass, but preferably up to 0.5% by mass, from the respective last stage of the evaporation process, characterized in that the distillative evaporation process is performed by an evaporator selected from an at least 1-stage, preferably a 1- to 3-stage, and more preferably a 2-stage, falling-film evaporator; a countercurrent falling-film evaporator; a down-draft evaporator; a rotary thin-film evaporator having oscillating wipers; a helical-tube evaporator; a plate-type evaporator; and a climbing-film evaporator.

In a particularly preferred embodiment the subject matter of the invention is a process as in principle described above, but pursuant to FIG. 1, characterized in that
a) water-moist nitrocellulose (1) having a proportion of water of 25-45% by mass, but preferably from 25 to 35% by mass, is processed (5) in a slightly water-miscible or water-immiscible solvent (2, 3) customary for nitrocellulose to give a crude nitrocellulose solution (4) having a proportion of nitrocellulose of 3.5 to 12.5% by mass, but preferably from 4.5 to 9% by mass, after which
b) this crude nitrocellulose solution (4) is subjected continuously to a partial distillative evaporation in a 1- to 3-stage, but preferably 2-stage, falling-film evaporation (6, 7) of a design customary in principle, and
c) a finished nitrocellulose solution (8) formed with a proportion of nitrocellulose of from 20 to 35% by mass, but preferably from 25 to 30% by mass, and a residual proportion of water of up to 1% by mass, but preferably up to 0.5% by mass, is taken off continuously from the falling-film evaporator of the respective last stage, preferably from the falling-film evaporator of the second stage (7).

In the following, preferred embodiments of the invention are described. The reference signs given below in paranthesis refer to FIG. 1. However, they are not intended to limit the invention to the process shown in FIG. 1 but are merely added to facilitate the understanding of the process of the invention.

Within the category of gravity-driven thin-film evaporators, the preferred falling-film evaporator design is divided into countercurrent falling-film evaporators and down-draft evaporators. In both types, heated vertical tube bundles are used for receiving the liquid phase and discharging the latter in the form of a film. A substantial difference is the removal of the vapor produced, which in the first case flows upward countercurrent to the downward-flowing liquid phase and is obtained separately there. In the down-draft evaporator, liquid phase and vapor produced flow downwards (cocurrent) and must be separated after emerging together.

A further design utilizing gravity comprises vertical rotary thin-film evaporators whose evaporation space is formed by only a single, externally heated tube and wiper blades mounted therein in oscillating manner on a central shaft driven mechanically from outside rotate with the shaft and pass over the inner heating surface of said tube at an adjustable distance (gap). As a result, liquid phase entering at the top of the heating tube circumference is distributed from the first wiper position in the circumferential direction as a film on the heating surface, after which said film flows downward over the heating surface and, promoted by the repeated action of a plurality of further wiper positions present along said shaft, can be concentrated to high concentrations or viscosities. The resulting vapor preferably flows away countercurrent in an upward direction.

Designs with flow over the heating surfaces which is usually forced by external pumps and hence independently of gravity are helical-tube evaporators having tube coils connected in parallel or in series and plate-type evaporators having a multiplicity of heating surfaces arranged parallel. The first-mentioned permit the concentration of even highly viscous fluids in comparatively thin layers with vapor taken off in the same direction (cocurrent). Plate-type evaporators can carry the resulting vapor phase cocurrent and/or countercurrent to the liquid phase.

A further design which can be used for thin-film evaporation comprises so-called climbing (film) evaporators. Also designed as a vertical tube bundle in a heating jacket, the solution to be concentrated is fed into the bottom of the tubes of these apparatuses and, with the onset of vapor evolution, the vapor stream carries a liquid phase so to speak as thin annular layers along the heating surface in an upward direction (cocurrent) for common discharge with subsequent separation.

The above mentioned "solvent", which is preferably a slightly water-miscible or water-immiscible solvent, in which the water-moist nitrocellulose is processed may be any organic solvent, organic non-solvent or mixtures thereof customary for nitro-cellulose known by the skilled person. The organic solvent may be, for example, selected from the group comprising ethyl acetate, propyl acetate, butyl acetate, ethyleneglycol monomethyl ether acetate, ethyleneglycol monoethyl ether acetate, methyl ethyl ketone, methyl isobutyl ketone, isophorone, cyclohexanone, nitroethane, and/or nitropropane. The mentioned organic non-solvent is preferably used as part of a mixture of solvent and non-solvent and may be, for example, selected from the group comprising hexane, heptane, octane solventnaphtha, cyclohexane, methyl cyclohexane, benzene, toluene, and/or xylene. In case of use of mixtures of the above solvents with the non-solvents the ratio of solvent to non-solvent may be in the range of 9:1 to 1:9.

In preferred embodiments of the invention each of the above described processes is characterized in that ethyl acetate is used as solvent (2, 3, 12).

Carrying out the proposed process in particular by means of gravity-driven thin-film evaporation requires flowable NC solutions. In the course of the concentration to a finished NC solution, the viscosity of the liquid phase does of course increase with the NC concentration. However, the solution viscosity is determined to an even greater extent by the average macromolecule chain length introduced by the polymeric NC types evaporated in each case. NC types in demand as coating materials (in particular finishes and paints) or as components therefor are declared as follows for characterizing their main features according to DIN ISO 14446: E 3 to E 38, A 7 to A 38 and M 12 to M 38. The letters characterize the maximum nitrogen content in the relevant NC while the numbers indicate the viscosity range of in each case NC solutions prepared in a standard manner and measured. Accordingly, the following distinction can be made: numbers less than or equal to 17 characterize highly viscous NC types, 18 to 29 defines the range of medium-viscosity NC types and greater than or equal to 30 indicates low-viscosity NC types.

Because, according to the invention, a large amount of solvent (especially for entraining distillation of water to be removed) is added for the preparation of the crude NC solution, an uncritical viscosity of the crude NC solution thus produced with NC contents of from 3.5 to 12.5% by mass always results also independently of the viscosity range from which the water-moist NC types used originate. It was found that, in order to ensure undisturbed gravity-driven thin-film evaporation, preferably in a countercurrent falling-film evaporator, and equally for the subsequent handling for compounding and processing the finished NC solution at temperatures lower than evaporation temperatures (e.g. room temperature, about 20-25° C.), said crude NC solutions of highly viscous NC types are preferably to be concentrated to 15 to 20% by mass, those of medium-viscosity NC types preferably to 22 to 27% by mass and those of low-viscosity NC types preferably to 29 to 35% by mass NC content in the finished solution. The process, which is preferably carried out continuously according to the invention, permits reliable monitoring, feasibility and balancing of the concentration at constant quality of the finished NC solution produced by means of customary measuring and regulating apparatuses for flow rates (e.g. streams 1, 2, 4, 8, 9, 12, 18, 21), temperatures (e.g. streams 8, 9(6), 9(7), 10, 13, 17(6), 17(7), 21) and pressures (e.g. 9(6), 9(7), 13(6), 13(7), 18).

In view of the known prior art, the above gravity-driven or mechanically (oscillating wipers) or hydraulically (pumps) assisted thin-film evaporators, but preferably the countercurrent falling-film evaporators operated according to the invention, offer the best preconditions for economically effective and product-protecting and technically reliable production of comparatively pure and concentrated finished NC solutions from crude NC solutions by a thermal method.

In further preferred embodiments of the invention each of the above described processes may be characterized in that from 40 to 80% by mass, but preferably from 50 to 70% by mass, of the respective predetermined amount to be evaporated altogether from the crude nitrocellulose solution (4) are evaporated in the first stage falling-film evaporator (6).

In further preferred embodiments of the invention each of the above described processes may be characterized in that the falling-film evaporators, in the preferred 2-stage falling-film evaporation the first and second stage falling-film evaporators (6) and (7), operate under identical or individually different pressures in the range from the respective ambient atmospheric pressure increasing up to 2.5 bar, but preferably in the range from 1.1 to 2.2 bar.

In further preferred embodiments of the invention each of the above described processes may be characterized in that the evaporation mixture (9) is conveyed in each case countercurrent to the crude nitrocellulose solution film (4) and is taken off separately from each falling-film evaporator (6, 7).

In further preferred embodiments of the invention each of the above described processes may be characterized in that a condensate mixture (10) preferably subsequently cooled to below 30° C. is fed to a separation container (11) for continuous phase separation and water-saturated solvent (3) separated off there is directed back to the stirring container (5) for production of the crude nitrocellulose solution (4).

In further preferred embodiments of the invention each of the above described processes may be characterized in that an amount from 0 to 100% by mass of the fresh solvent (2), but preferably from 50 to 100% by mass thereof and optionally additionally a further portion of water-saturated solvent (12) branched off from the water-saturated solvent quantity (3) in an amount of from 0 to 35% by mass, but preferably from 0 to 25% by mass, are evaporated in the solvent evaporator (14) to give a solvent vapor (13).

In further preferred embodiments of the invention each of the above described processes may be characterized in that the solvent vapor stream (13) is passed into the falling-film evaporators (6, 7), preferably into the two evaporators (V1, V2) in the 2-stage embodiments, as stripping or entraining vapor countercurrent to the liquid phase, but preferably only into the last stage falling-film evaporator (7).

In further preferred embodiments of the invention each of the above described processes may be characterized in that nitrocelluloses required by the coating and printing ink industry, but preferably the nitrocellulose types standardized according to DIN ISO 14 446 and nominated within the ranges E 12 to E 38, M 15 to M 38 and A 15 to A 38 are used as water-moist nitrocellulose (1).

In further preferred embodiments of the invention each of the above described processes may be characterized in that the solvent is stripped out in a technically customary manner, but preferably with steam, from the water phase (15) separated off continuously in the separation container (11) and is directed back in vapor form into the evaporation mixture stream (9).

In further preferred embodiments of the invention each of the above described processes may be characterized in that the quantities of heat to be removed from the evaporation mixture (9) and the condensate mixture (10) are utilized for preheating the crude nitrocellulose solution (4) and the fresh solvent stream (2) and optionally the water-saturated solvent stream (12).

The process according to the invention is to be described in more detail with reference to FIG. 1: in the actual NC preparation process, it is known that stabilized water-moist nitrocellulose 1 produced in fibrous form (wool) or as particulate shreds or uniformly cut cubes or short pellets, having a proportion of water of 25 to 45% by mass, but preferably from 25 to 35% by mass, is processed, preferably in a stirring container 5, in a slightly water-miscible or water-immiscible fresh solvent 2 customary for nitrocellulose, i.e. as described above, and/or optionally in an already water-saturated solvent 3, but preferably in ethyl acetate, to give a crude nitrocellulose solution 4 comprising from 3.5 to 12.5% by mass, but preferably from 4.5 to 9% by mass, of nitrocellulose in the stirring container 5. This crude NC solution 4 is then continuously subjected to a partial distillative evaporation in a 1- to 3-stage falling-film evaporation, but preferably in a 2-stage falling-film evaporation 6 and 7, after which a finished nitrocellulose solution 8 formed with a proportion of nitrocellulose of from 20 to 35% by mass, but preferably from 25 to 30% by mass, and a proportion of residual water of up to 1% by mass, but preferably only up to 0.5% by mass, is continually taken up from the last stage falling-film evaporator, but preferably from the second stage falling-film evaporator 7.

In the first stage falling-film evaporator 6, from 40 to 80% by mass, but preferably from 50 to 70% by mass, of the amount of fluid phase to be evaporated altogether from the crude NC solution 4 provided in each case for achieving a predetermined finished NC solution 8, said fluid phase consisting of solvent and water. The respective resulting remaining amount to be evaporated is evaporated in the next stage falling-film evaporators, preferably in the second stage falling-film evaporator 7. The evaporators, preferably the evaporators 6 and 7 preferably operate under the same operating pressure, but optionally also with different pressures in a range starting from in each case ambient atmospheric pressure increasing to not more than 2.5 bar, but preferably within a range from 1.1 to 2.2 bar. The resultant evaporation mixture 9, consisting of solvent vapor and steam, is stripped off to the condenser 16 for condensation, and condensate mixture 10 flowing therefrom and subsequently cooled to at least 30° C. is passed into the separation container 11 for separation.

Water-saturated solvent 3 deposited there as a result of separation, but preferably water-saturated ethyl acetate, is directed back to the stirring container 5 for the preparation of the crude NC solution 4 and the water to be removed with the solvent-saturated phase 15 in view of the intended use is likewise discharged from separation container 11. Solvent present therein is then recovered in a simple stripping process. The evaporation mixture 9 is taken off via the top from the falling-film evaporators 6 and 7. In the first and second stage falling-film evaporators 6 and 7, the procedure is carried out with particularly effective countercurrent flow of liquid film and vapor phase in continuous operation. Omission of said external force circulation of the solution results in additional economic advantages and operational advantages for the falling-film evaporators, in that a comparatively short average residence time of the falling or trickle films on the heating surfaces of both evaporators 6 and 7 makes a substantial contribution to the thermal protection of dissolved NC. Thus, the vacuum operation for boiling point depression and as a consequence thereof very large vapor volume flows of evaporation mixture 9 with their disadvantageous effects in the first and second stage falling-film evaporators 6 and 7 on the countercurrent operation and with regard to the dimensions of the plant can be avoided. In a further process design according to the invention, the cost-efficiency of the process also increases by virtue of the fact that solvent vapor 13 produced in a separate solvent evaporator 14 of suitable customary design is passed as so-called stripping or entraining vapor at the bottom into the tube space, preferably of the last evaporator stage 7. In order to obtain an anhydrous solvent vapor 13 or at least a solvent vapor having a comparatively low water content 13, from 0 to 100% by mass, but preferably from 50 to 100% by mass, of the fresh solvent quantity 2 preferably to be introduced in anhydrous form and finally necessary for the finished NC solution 8 according to the chosen starting conditions, and optionally a portion of water-saturated solvent 12 branched off from the water-saturated solvent quantity 3 in an amount of from 0 to 40% by mass, but preferably from 0 to 25% by mass, of water-saturated solvent 3, are evaporated in the solvent evaporator 14. In an embodiment of the process according to the invention which is particularly advantageous with respect to energy, the heat to be removed from evaporation mixture 9 and that to be removed from finished NC solution 8 is utilized for preheating the crude NC solution 4 to be introduced and the fresh solvent 2 to be freshly introduced and the water-saturated solvent 12 optionally branched off from the water-saturated solvent 3. In addition, in the case of operation with different operating pressures (pressure in evaporator 6>pressure in evaporator 7), it is very economical in terms of energy to heat the second stage evaporator 7 with the evaporation mixture 9 from the first stage evaporator 6. The process according to the invention is also further improved economically and in particular ecologically by effecting said recovery of the solvent from the solvent-saturated water 15 in a well known manner by means of a stripping column 19 with steam 18 as stripping steam and directing back the resulting mixture 20 of solvent vapor and steam taken from the head of the stripping column 19 into the evaporation mixture stream 9. The sewage 21 is taken from the bottom of the stripping column 19.

| In FIG. 1, the meanings are as follows: | |
| --- | --- |
| 1 | nitrocellulose, water-moist (SW) |
| 2 | solvent, fresh (LP) |
| 3 | solvent, water-saturated (LW) |
| 4 | crude NC solution (RL) |
| 5 | stirring container (B) |
| 6 | falling-film evaporator, stage 1 (V1) |
| 7 | falling-film evaporator, stage 2 (V2) |
| 8 | finished NC solution (FL) |
| 9 | evaporation mixture (DG) |
| 10 | condensate mixture (KG) |

-continued

In FIG. 1, the meanings are as follows:

| | |
|---|---|
| 11 | separation container (A) |
| 12 | solvent, water-saturated (LV) |
| 13 | solvent vapor, optionally water-containing (LD) |
| 14 | solvent evaporator (V3) |
| 15 | water, solvent-saturated (WA) |
| 16 | condensation (K) |
| 17 | heating medium (HM) |
| 18 | steam |
| 19 | stripping column |
| 20 | mixture of solvent vapor and steam |
| 21 | sewage |

The process according to the invention is suitable for the NC types usually demanded by the coating and printing ink industry if these are to be delivered as alcohol- or plasticizer-free finished solutions having a low water content. In particular, the nitrocellulose types (according to DIN ISO 14446) E 12 to E 38, and furthermore M 15 to M 38 and particularly A 15 to A 38 are customary for this purpose.

EXAMPLES

In table 1, examples 1 to 4 show the results of a continuous preparation of finished NC solutions 8 from crude NC solutions 4 produced in each case with water-moist nitrocellulose 1 and ethyl acetate as fresh solvent 2 and/or water-saturated solvent 3 by the process according to the invention.

TABLE 1

| | Example 1 | Example 2 | Example 3 | Example 4 |
|---|---|---|---|---|
| NC type (water-moist nitrocellulose) | E 28 | E 34 | M 34 | A 30 |
| Desensitizer | Water | Water | Water | Water |
| Content in % by mass | 33.5 | 35.1 | 32.1 | 29.9 |
| Solvent used | Ethyl acetate | Ethyl acetate | Ethyl acetate | Ethyl acetate |
| Ma % fresh solvent stream 2 to solvent vapor stream 13 | 100 | 100 | 100 | 100 |
| Ma % solvent stream 3 to solvent stream 12 | 15 | 20 | 15 | 10 |

TABLE 1-continued

| | Example 1 | Example 2 | Example 3 | Example 4 |
|---|---|---|---|---|
| Crude NC solution | | | | |
| Content in % by mass | NC 7.5 | NC 7.3 | NC 8.0 | NC 8.6 |
| | Water 6.3 | Water 6.5 | Water 6.3 | Water 6.1 |
| Residue | Solvent | Solvent | Solvent | Solvent |
| Finished NC solution | | | | |
| Content in % by mass | NC 30.8 | NC 30.0 | NC 31.5 | NC 32.1 |
| | Water 0.4 | Water 0.5 | Water 0.4 | Water 0.3 |
| Residue | Solvent | Solvent | Solvent | solvent |

The invention claimed is:

1. A continuous process for the preparation of low water content nitrocellulose solutions, comprising the steps of:
   providing a crude nitrocellulose solution comprising a solvent, water, and 3.5 to 12.5% nitrocellulose by mass,
   introducing the crude nitrocellulose solution into a first falling-film evaporator;
   passing the crude nitrocellulose solution through the first falling-film evaporator into a second falling-film evaporator;
   taking off from the second falling-film evaporator a finished nitrocellulose solution having 20 to 35% nitrocellulose by mass and a residual proportion of water of up to 1% by mass; and
   recirculating a portion of the solvent for subsequent reuse in preparing an additional crude nitrocellulose solution.

2. The process of claim 1, wherein the first falling-film evaporator removes 40 to 80% by mass of the solvent and the water from the crude nitrocellulose solution.

3. The process of claim 1, wherein the first falling-film evaporator and the second falling-film evaporator operate at identical pressure.

4. The process of claim 1, wherein the first falling-film evaporator and the second falling-film evaporator operate at different pressures.

5. The process of claim 1, wherein the solvent is ethyl acetate.

6. The process of claim 1, wherein the step of recirculating a portion of the solvent further comprises using heat from the recirculated solvent to preheat the additional crude nitrocellulose.

\* \* \* \* \*